INVENTORS H. R. BANKS
L. C. RAINONE
J. A. McCorkendale
ATTORNEY

NO-TEST TRUNK CIRCUIT FOR PRIVATE BRANCH EXCHANGES

Filed Dec. 20, 1966 7 Sheets-Sheet 2

NO-TEST TRUNK CIRCUIT FOR PRIVATE BRANCH EXCHANGES 3,509,285

NO-TEST TRUNK CIRCUIT FOR PRIVATE BRANCH EXCHANGES

Harry R. Banks, Neptune, and Louis C. Rainone, Matawan, N.J., assignors to Bell Telephone Laboratories, Incorporated, Murray Hill, N.J., a corporation of New York Filed Dec. 20, 1966, Ser. No. 603,364
Int. Cl. H04m *3/20*
U.S. Cl. 179—27 13 Claims

ABSTRACT OF THE DISCLOSURE

A no-test trunk circuit which permits the selective connection of a PBX attendant's position through the no-test trunk circuit to a busy station line or trunk. The transmission path of the busy line or trunk is split and the attendant may transmit to either the source end or the destination end, or both simultaneously, and may receive from either the source or destination end as desired. The attendant may thus seize or take over a busy line or trunk employed for data services for use in establishing a higher priority call.

This invention relates to a private branch exchange telephone system and more particularly to a no-test trunk circuit for private branch exchanges.

It is common practice to provide in the larger telephone central offices means whereby so-called "no test" connections can be completed to an existing, i.e., a "busy," call connection. Such connections may be required, for example, for "busy verification" purposes, that is to permit an attendant to cut in on an apparently busy connection in order to determine whether a call is actually in progress or that the busy indication has resulted from a "trouble" condition. It has been recognized that there is also a need for this type of facility in connection with automatic private branch exchanges of the larger type, for example the general type of automatic private branch exchange disclosed in United States Patent 2,904,637 issued Sept. 15, 1959 to R. D. Williams. As a matter of fact, no-test facilities have been provided in that environment to some extent, one such system being disclosed in the copending application of E. L. Erwin et al., now Patent No. 3,410,960, entitled "No-Test or Busy Verification in a Private Branch Exchange Telephone System," issued Nov. 12, 1968. However, since there is inherent in such facilities the ability of an attendant or a repairman to cut in on a busy line, a function ordinarily denied to personnel of an automatic private branch exchange, it will be apparent that the provision of these facilities in such environment involves major problems with circuit and equipment design. These problems become even greater when the circuits are being used under special security regulations which restrict the nature of attendant's connections which are permitted to be completed thereto. For example, in the use of the circuits under the special regulations just referred to, it is desirable to be able to "split" the busy line or trunk at the time the no-test connection is completed in order, for example, that the new connection may permit listening in on only one end of the line or trunk. Thus a bridged connection via the crossbar switch contacts as described in the E. L. Erwin et al. patent for example is not readily adaptable to the purpose.

Also, telephone networks of the above-referred-to nature are now being used in increasing numbers for providing so-called data services. An ordinary telephone call serves to set up the connection whereupon, through the medium of appropriate Data-Phone data sets provided by the telephone companies, many kinds of business machines provided by the customer can communicate through the network. When this type of communication is taking place the no-test connection is often initiated in order that the attendant may seize or take over the busy line or trunk for use in establishing a call of higher priority than the call in progress. In such instance special means must be provided for changing the seized line or trunk to a talking mode.

Accordingly, it is an object of our invention to improve the operation of automatic private branch exchange systems.

A more specific object of our invention is to facilitate the completion of no-test connections in an automatic private branch exchange system.

A further specific object of our invention is the completion of no-test connections to a line under conditions compatible with the special security conditions under which the line is being used.

Yet another specific object of our invention is to change the mode of a busy line compatible with the type of transmission with which it is to be used.

In accordance with a specific embodiment of our invention a no-test trunk is provided which may be seized by the attendant by operating a key at her position. After activating the no-test trunk and receiving dial tone thereover, the attendant dials the code of the busy station line or trunk to be intercepted. The dialed information when received by the decoder is translated and the decoder grounds the code point corresponding to the dialed information. The code point is cross-connected to the respective station line or trunk and the ground operates the no-test relay in that circuit. This, in turn, operates a connector relay in the no-test trunk which is effective to close the necessary transmission and signaling paths between the no-test trunk and the busy station line or trunk. An "early release" signal is transmitted to the decoder which causes decoder and marker release so that the function of completing the dialed connection in the normal manner via the switch points is discontinued after the code point has been selected and grounded in the decoder. At the time the transmission and signaling paths are closed between the no-test trunk and the busy line or trunk the transmission path of that line or trunk is split and the attendant is connected according to one of several options whereby to assure compatibility with the security requirements of the circuit at the moment. For example the attendant may be connected for transmission to either the source end or the destination end, or both simultaneously, and for receiving from either the source end or the destination end as desirable.

A feature of our invention is the utilization of distinctive code points in the decoder in conjunction with a special class-of-service mark to direct the completion of a connection to a busy line.

A further feature of our invention is the splitting of the transmission path in the intercepted line whereby the attendant may be connected for transmitting and/or receiving to the respective ends as desired.

Yet another feature of our invention is the application of special tones to the line when the transmission path is split for the purpose of indicating preemption or for changing the condition of equipment operating on the line.

A full understanding of the arrangement contemplated by the present invention as well as an appreciation of the various advantageous features thereof may be gained from consideration of the following detailed description in connection with the accompanying drawing, in which.

GENERAL DESCRIPTION

Figure 8:
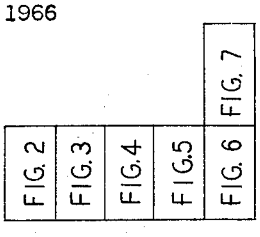
FIG. 8 shows the manner in which FIGS. 2 to 7 should be arranged to show the specific illustrative embodiment of the invention.
Figure 1:
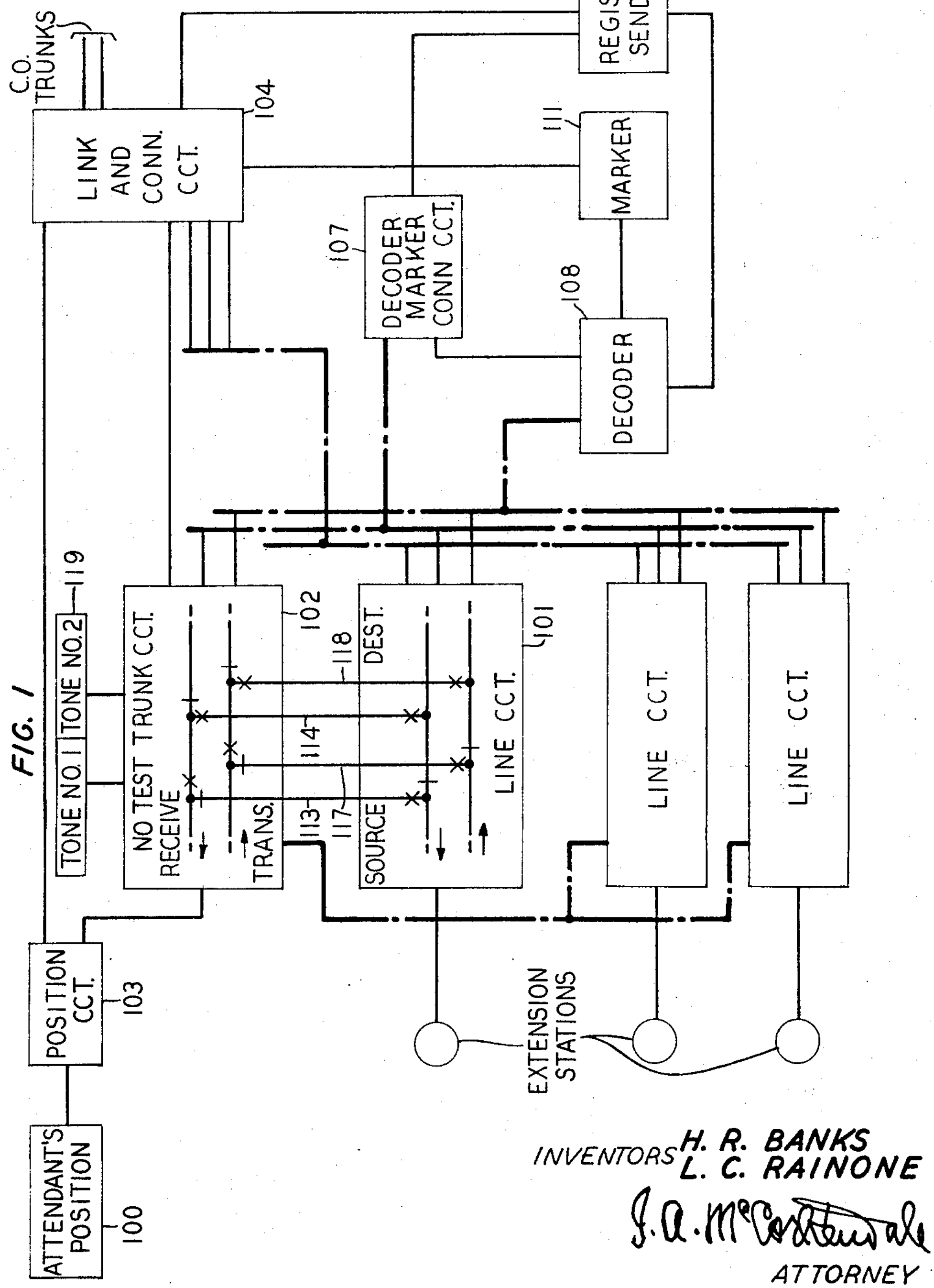
FIG. 1 shows schematically the relationship of certain of the basic individual circuits which comprise one specific illustrative embodiment of the PBX system contemplated by our invention.
Figure 2:
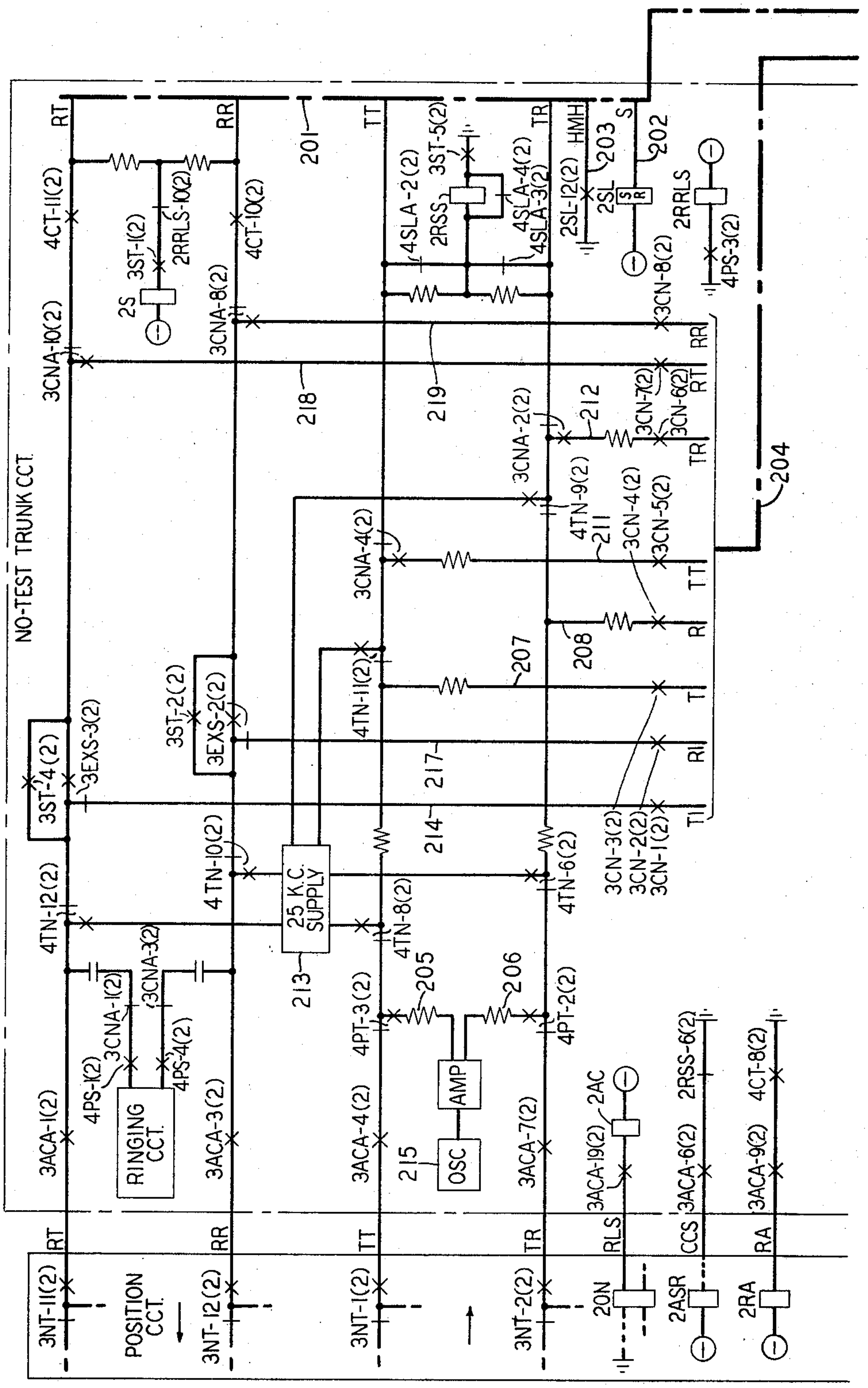
FIGS. 2, 3 and 4 show particularly the no-test trunk circuit.
Figure 3:
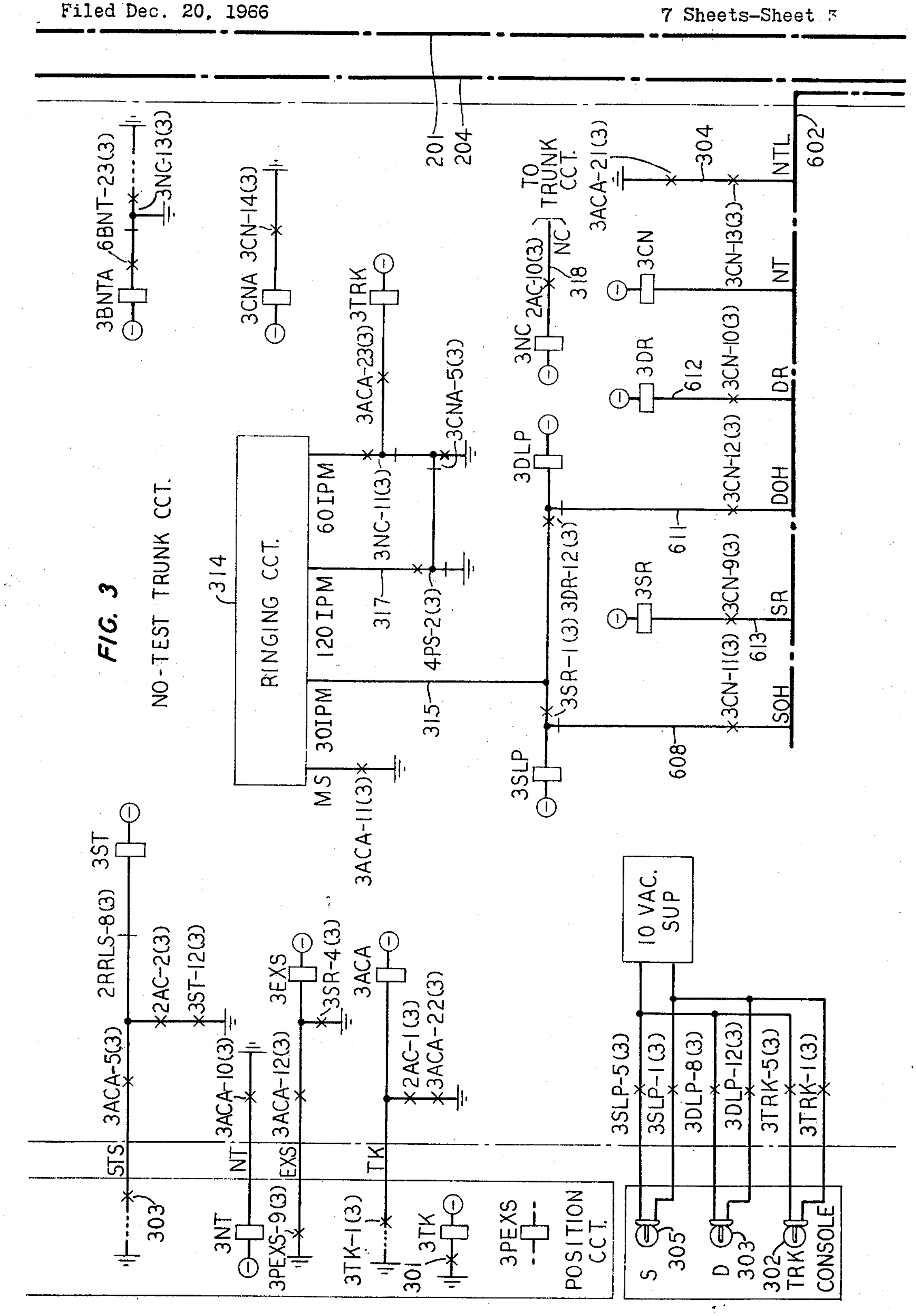
Figure 4:
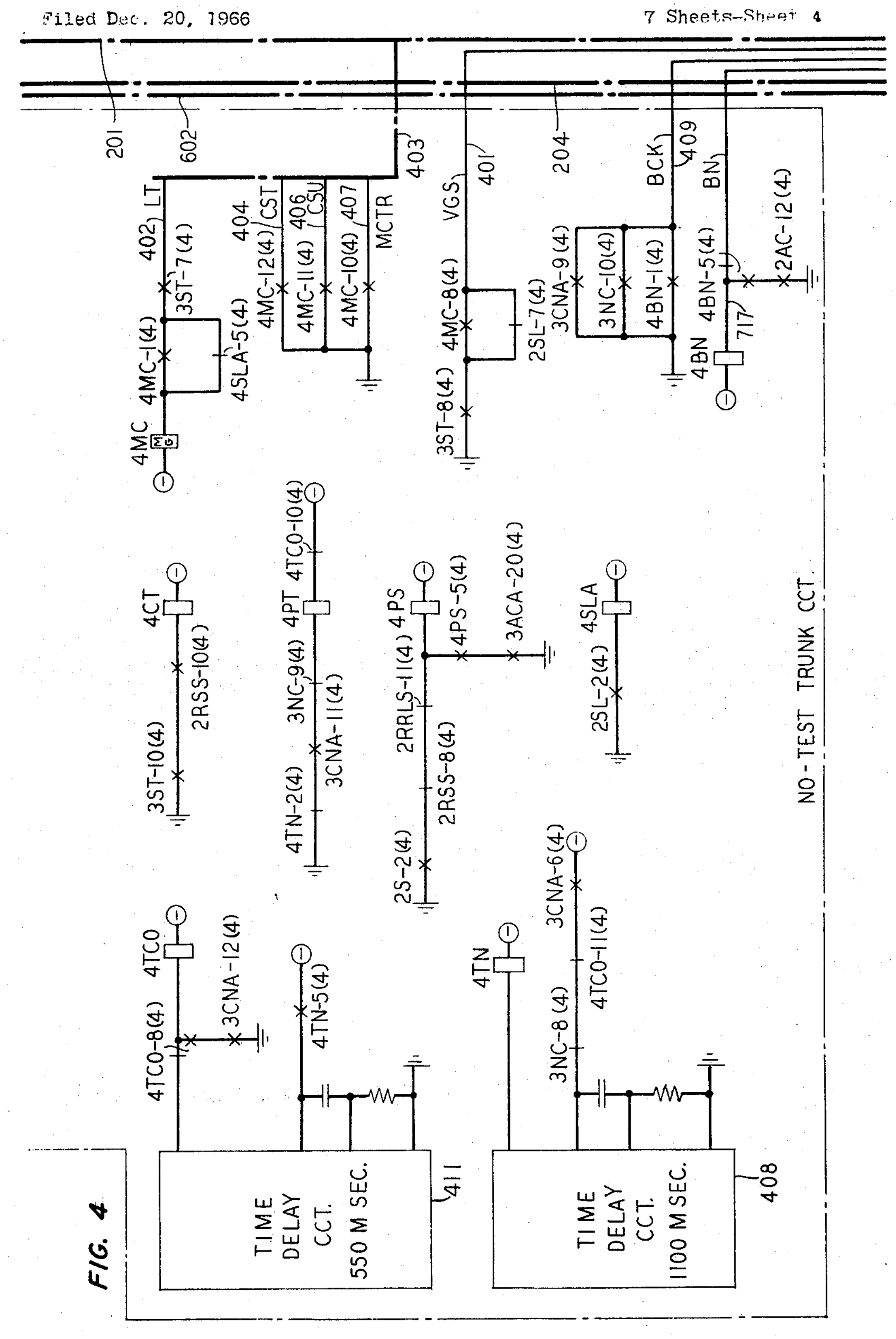
Figure 5:
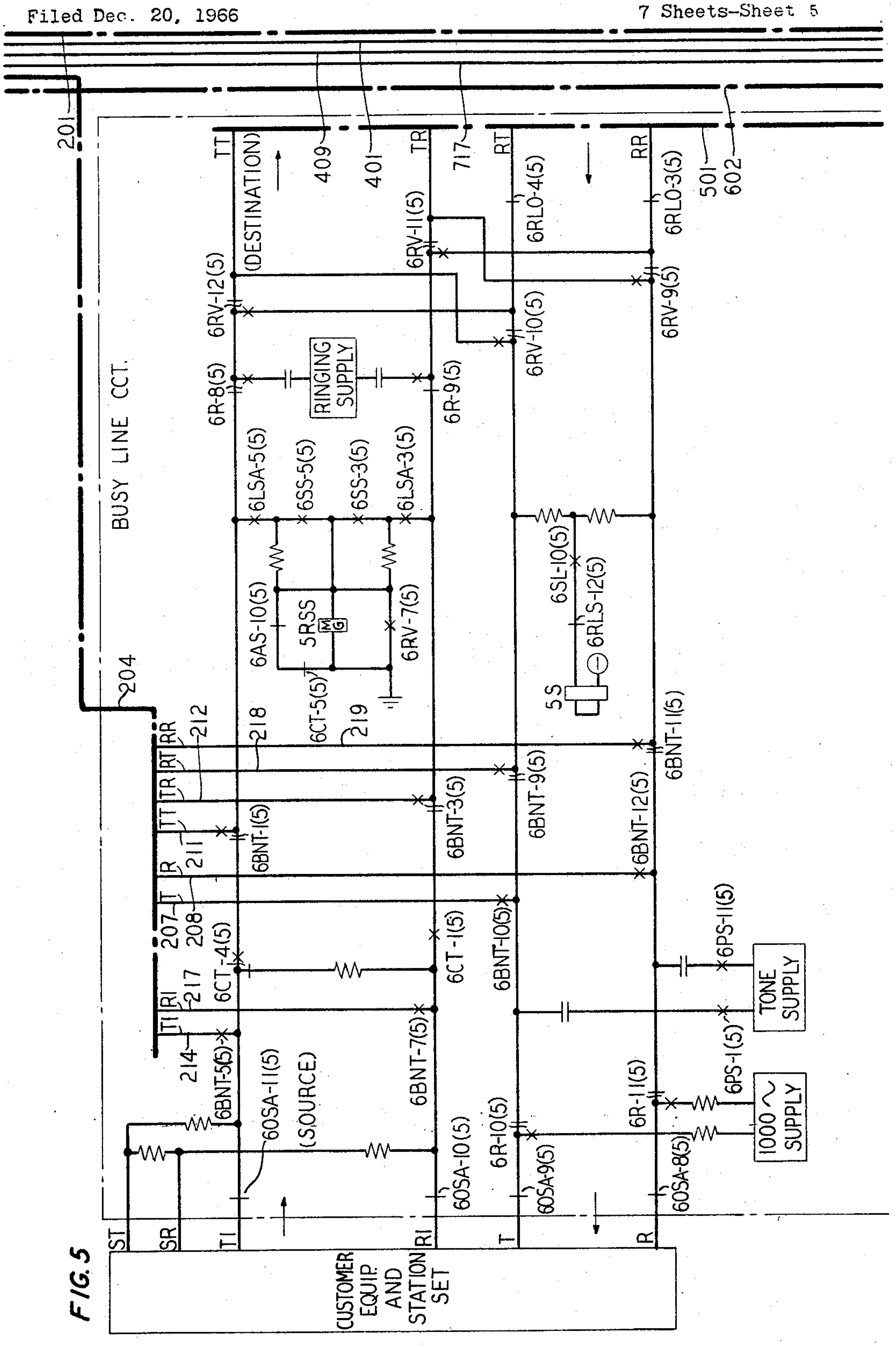
FIGS. 5 and 6 show particularly a 4-wire station line circuit of the type in connection with which the no-test circuit is adapted to be used.
Figure 6:
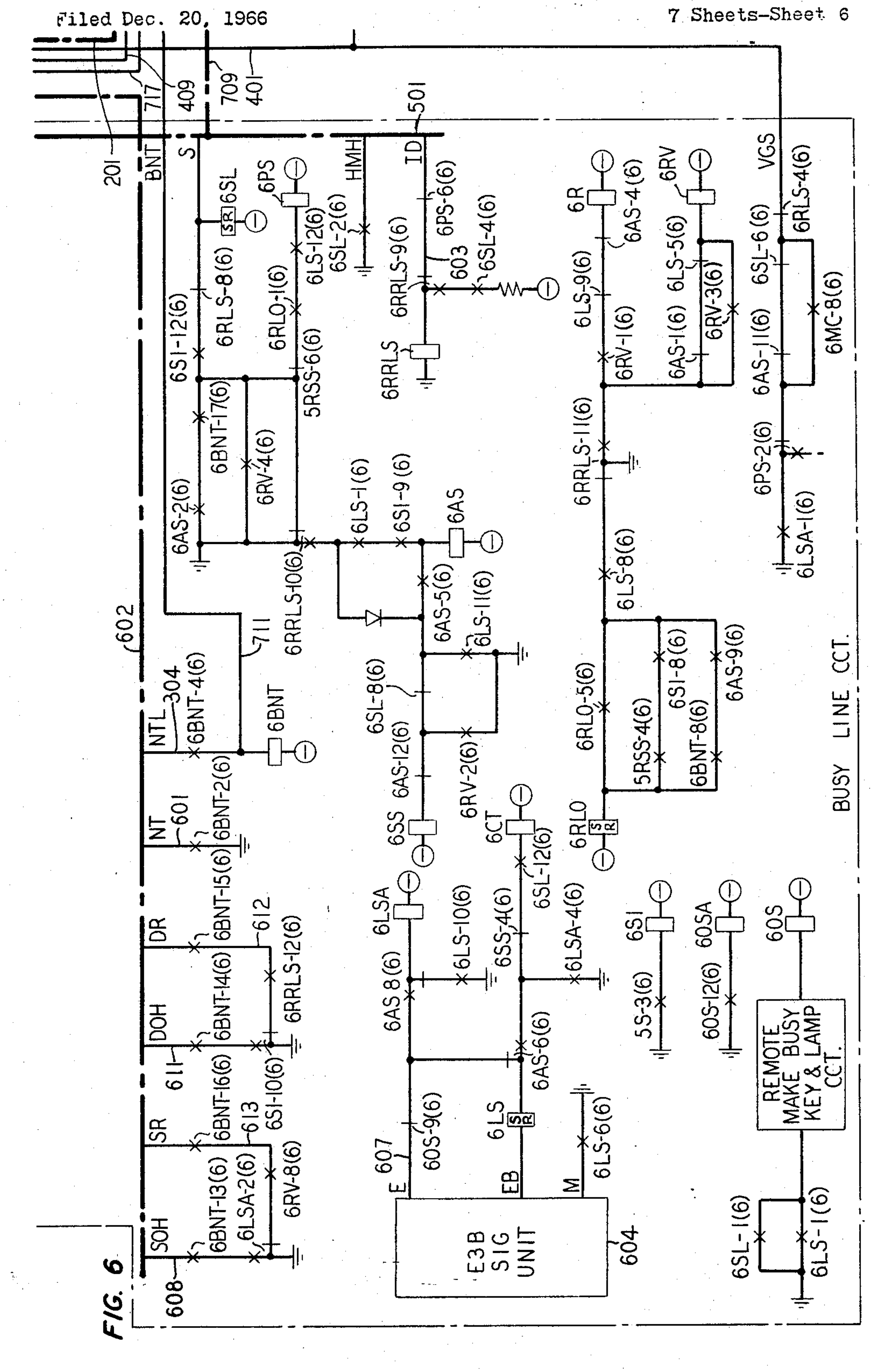
Figure 7:
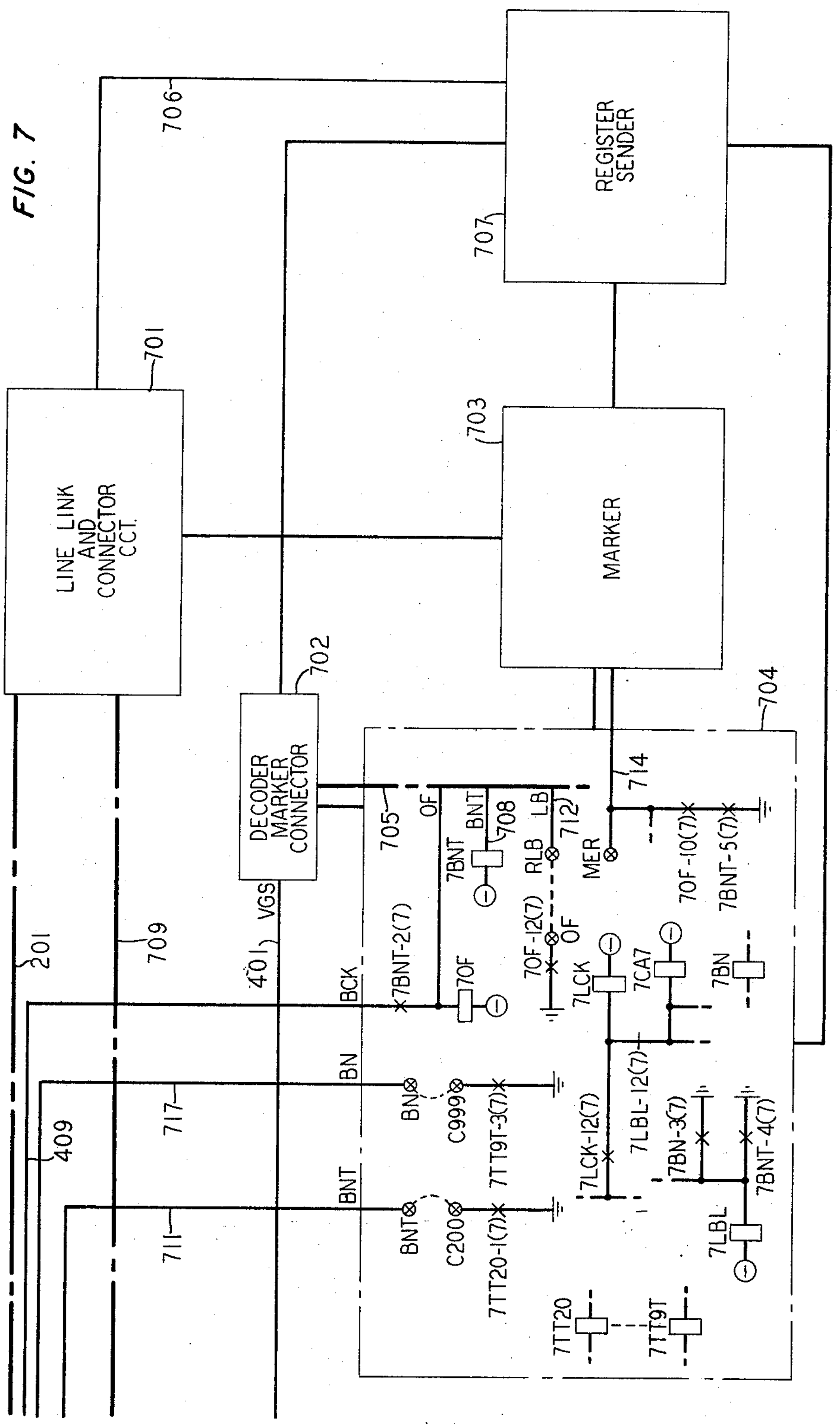
FIG. 7 shows schematically the relationship of the decoder to other portions of the system and shows in detail the manner in which a previously known decoder circuit is modified for operation in connection with the present system.

The arrangement and operation of the various components of the illustrative embodiment of the invention will be described in detail subsequently with reference to FIGS. 2 to 7 inclusive. However, in order to first gain a general overall understanding of the arrangement contemplated, a brief general description will be given at this point with reference particularly to FIG. 1. Referring therefore to FIG. 1 there is illustrated schematically a 4-wire, crossbar, common control PBX of the general type disclosed in the above-referred-to patent of E. L. Erwin et al. In the present instance, however, it will be assumed that the circuits are being operated under special security regulations which restrict the nature of the attendant's connections which are permitted to be completed thereto; this condition was not present in the instance of the arrangement disclosed in the application just referred to. Among these restrictions may be, for example, that only one transmitter be permitted to be connected at any one time to the receivers.

For purposes of simplification each pair of line wires is shown in FIG. 1 as a single line; it will be understood that the no-test trunk circuit 102 includes a receive pair (indicated by the upper single line with arrow) and a transmit pair (indicated by the lower line with arrow) and that the line circuit 101, similarly, includes a receive pair and a transmit pair as indicated by the arrows. Also, for purposes of clarity of description, the "near" end of the line will be referred to as the source end and the "far" end as the destination end.

The attendant is also provided with a 4-wire circuit which is connected through the position circuit in the general manner described in Patent 3,099,719 issued July 30, 1963 to A. E. Gerbore et al. When the attendant's circuit is connected through the position circuit to the no-test trunk 102, her receiver is connected to the receive side of the trunk and her transmitter is connected to the transmit side of the trunk.

It will be understood that the overall operation of the link and connector circuit 104, decoder-marker connector circuit 107, decoder 108, marker 111 and register sender 112 is generally similar to that described in the above-referred-to patent of E. L. Erwin et al. and as further described in such patents as Patent 2,585,904 issued Feb. 19, 1952 to A. J. Busch, Patent 2,981,804 issued Apr. 25, 1961 to H. H. Abbott et al. and the A. E. Gerbore et al. patent referred to just above.

In the usual operation of this circuitry, as described in the above noted patents and applications, the subscriber station or set, or the attendant at position 100 operating through the position circuit 103, dials the code of the connection to be set up by the switching equipment included in the link and connector circuit 104; this switching equipment may advantageously include crossbar switches. The dial impulses are forwarded through the link circuit to the register sender 112 which calls in the decoder 108. The marker 111 receives the decoded information from the decoder and in response thereto operates the appropriate switches in the link circuit 104 to establish the connection to another line circuit or to a central office trunk.

In the absence of our invention, a position circuit could request the establishment of a connection by the link circuit 104 to an existing connection, as between a line circuit and a central office trunk. If this were done, however, the position circuit would be in direct two-way communication with both ends of this existing connection which may not be desirable if the existing connection is being utilized under certain security regulations.

It should be noted, in order further to highlight our inventive arrangement, that the normal procedure is for the decoder and marker to be called in after the dial impulses are received by the register sender and then for the marker, cooperating with the decoder, to establish the connection desired. In contrast in accordance with an aspect of our invention these normal procedures of the decoder and marker are aborted at a particular point in the call processing, after which a connection is established by a direct path not involving the marker or the link circuit.

For purposes of clarity and simplification certain equipments involved in the normal operation of the circuitry in establishing connections between the line circuits and the link circuit, such as the marker connector relays in each line circuit, have been omitted from the detailed description set forth below.

It will now be assumed for purposes of description that line circuit 101 is busy on a connection and that the attendant wishes to come in on, that is intercept, the connection preparatory to taking over the line for a call of higher priority, suitable warning tones being applied to the line before take-over is completed. Accordingly the attendant activates no-test trunk circuit 102 by closing a key provided in the position circuit 103. It will be understood that, while the arrangement is shown in use with a station line, it is applicable to the same degree in connection with a tie trunk or other type of trunk.

After a register has been attached in the usual manner the receive side of the no-test trunk is cut through and dial tone is received thereover by the attendant at the position circuit. Marker 111 in servicing the call causes a "no-test" class-of-service signal to be transmitted from the no-test trunk to the decoder 108.

The attendant now proceeds to dial the code of the busy line circuit, the pulses being received in register 112 in the usual manner. When the register sender calls for decoder 108 on a no-test connection it operates in the decoder a class-of-service relay corresponding to the "no-test" class and also operates the digit relays corresponding to the dialed number. Class-of-service screening networks as described for example in the above-referred-to E. L. Erwin et al. patent, provide means for translation of the dialed number into a grounded code point corresponding to the busy called line. The individual code points are cross-connected to a no-test relay in the corresponding line. Accordingly, the no-test relay of busy line circuit 101 is now operated, as will be described in detail subsequently with regard to FIGS. 2 to 7.

Operation of this no-test relay just referred to causes an "early release" signal to be transmitted which is effective to release the marker and decoder at this point so that these units do not proceed further in completing the connection between the no-test trunk and the dialed busy line. However, as will also be described in detail subsequently, operation of the no-test relay also selectively completes paths via lines 113 and 114 between the receive pair of the no-test trunk and that of the busy line and completes via lines 117 and 118 paths between the transmit pair of the no-test trunk and that of the busy line. As will be explained in detail subsequently these connections may be completed on a selective basis compatible with the special security conditions under which the line is being used. For example, the path closures may be such that the transmit pair of the no-test trunk is connected through to the receivers at both the source end and the destination end of the busy line circuit while the attendant receiver is connected only to the source end of the busy line.

When the connections are first completed between the no-test trunk and the dialed busy line, a first tone from source 119 is applied to the line as a "preempt" signal; after a measured interval, the first tone is disconnected and a second tone is applied to the source, destination and attendant's receivers which tone is effective to place the respective units in the talking mode.

It will be clear from the above general description and from the subsequent detailed description that the novel arrangement contemplated by our invention permits connection of the no-test trunk to a busy line or trunk by dialing the code of the line or trunk desired and that the equipment normally utilized in such a procedure, that is marker, link, decoder, crossbar switch, is utilized for only a portion of the operation after which such equipment is released and the connection is completed through direct operation of the no-test relay of the dialed line or trunk. Also that the novel arrangement permits the transmission path of the selected line or trunk to be split whereby the attendant is able to transmit to either the source end or the destination end of the line or to both ends simultaneously and is able to receive from either the source end or destination end as desired.

DETAILED DESCRIPTION

Coming now to a more detailed description of the specific illustrative embodiment of the invention with particular reference to FIGS. 2 to 7 of the drawing, the circuits illustrated are arranged in the so-called "detached contact" type of representation wherein, generally speaking, relay contacts are shown separated from the relay winding which controls the respective contact. This type of disclosure permits functional groups of circuitry to be shown separately, thus facilitating an understanding of the operational features involved. Each designation of a relay winding is preceded by a numeral indicating the figure of the drawing in which the apparatus appears, for example the winding of relay 3ACA appearing in FIG. 3. Further, each contact designation is followed by a numeral in parentheses which indicates the figure of the drawing in which the contact appears, for example the designation "3ACA–6(2)" which indicates that contact No. 6 of relay 3ACA appears in FIG. 2 while the relay winding, as pointed out above, appears in FIG. 3. In accord with usual circuit design, transfer contact pairs may be either Early Make-Break (continuity) or Early Break-Make (sequence transfer) as dictated by the particular circuit operational requirements.

Initiation of no-test connection

It will be assumed now that the attendant wishes to utilize the no-test trunk to obtain a connection to the "busy" station line and, accordingly, closes the no-test trunk key 301 at the position circuit; this closes an obvious operate path for relay 3TK. Relay 3TK, operated, closes at make contact 3TK–1(3) an operate path for relay 3ACA of the no-test trunk. Relay 3ACA, operated, closes at make contact 3ACA–10(3) an operate path for no-test relay 3NT of the position circuit and closes at make contact 3ACA–19(2) a path over which relays 2ON and 2AC operate in series. Relay 3NT, operated in the position circuit, connects over circuit paths not shown in detail the receive side of the attendant's circuit to the receive side of the no-test trunk and the transmit side of the attendant's circuit to the transmit side of the no-test trunk. Relay 2AC upon operating completes at make contact 2AC–1(3) the locking path for the previously operated relay 3ACA.

TRK lamp 302 at the attendant's console is lighted steady at this point through make contacts 3TRK–5(3) and 3TRK–1(3); relay 3TRK is operated steady from ground, respective break contacts of transfer pairs 4PS–2(3), 3CNA–5(3), 3NC–11(3), make contact 3ACA–23(3), winding of relay 3TRK to battery. The attendant now closes start key 303 whereby to call in a register; closure of start key 303 completes an operate path for relay 3ST through make contact 3ACA–5(3) and break contact 2RRLS–8(3). Relay 3ST, upon operating, locks to ground through make contacts 2AC–2(3) and 3ST–12(3) and closes at make contact 3ST–5(2) a path for connecting ground to the simplex of the transmit pair of the trunk and for transmitting this ground towards the line link and connector 701 via cable 201. Also relay 3ST, operated, connects ground through make contact 3ST–8(4) to lead 401 for transmission to the decoder-marker connector 702.

The marker 703 operating in its normal manner to service the call connects ground to lead 402 via cables 201 and 403; this ground operates marker-connect relay 4MC through make contact 3SC–7(4) and break contact 4SLA–5(4). Relay 4MC, operated, locks to ground through make contact 4MC–1(4) and connects ground through make contact 4MC–12(4) to lead 404, through make contact 4MC–11(4) to lead 406 and through make contact 4MC–10(4) to lead 407; this ground provides the required "no-test" class-of-service information through the marker 703 to the decoder 704. Marker 703 also operates the proper hold magnet to close the required switch crosspoints.

When register 707 has been connected ground is applied via cable 201 and over lead 202 through normal circuit operations whereby to operate relay 2SL; relay 2SL, operated, connects ground through make contact 2SL–12(2) to lead 203 which connected ground acts as a holding ground to keep the hold magnet operated.

Relay 4SLA operates through make contact 2SL–2(4) following operation of relay 2SL; this is followed by operation of relay 2RSS since the shunt paths are removed at break contacts 4SLA–4(2), 4SLA–2(2) and 4SLA–3(2). Relay 2RSS, operated, closes at make contact 2RSS–10(4) the operate path for cut-through relay 4CT, relay 3ST having previously operated as described above. Relay 4CT, operated, closes at make contacts 4CT–10(2) and 4CT–11(2) the receive pair of the no-test trunk through to the position circuit and also closes a path for lighting a lamp (not shown) on the console indicating to the attendant that the register has been attached. Marker 703 releases at this point releasing relay 4MC.

Attendant dials code of busy line

The attendant has now received dial tone through the receive side of the no-test trunk, cut through at make contacts 4CT–10(2) and 4CT–11(2), and accordingly proceeds to dial the code of the busy line to which she desires to be connected. After the first digit has been dialed relay 2S operates over the receive simplex.

Assuming that the connection proceeds normally the register sender 707 will call in decoder 704. When a register sender calls for a decoder on a no-test connection, as in the present instance, it operates a class-of-service relay in the decoder corresponding to the no-test class as well as the digit relays corresponding to the dialed number. Accordingly, in the present instance register sender 707 will transmit a ground through decoder marker connector 702 and via cable 705 to lead 708 whereby to operate "no-test" class-of-service relay 7BNT in the decoder and will also operate tens translator relay 7TT20 which corresponds to the dialed code of the busy line.

As described in detail in the E. L. Erwin et al. patent referred to above, code points corresponding to the line and trunk codes are provided in the decoder, and, in the instance of the embodiment of our invention, certain of these code points in addition, to their ordinary wiring are cross-connected to a no-test relay provided in the line or trunk corresponding to the particular code point. Thus in the present instance code point C200 of decoder 704, which corresponds to the busy line which has just been dialed, is cross-connected to cross-connect point BNT. Accordingly upon operation of relay 7TT20 as previously described ground is applied through make contact 7TT20–1(7) to lead 711 and transmitted thereover to operate no test relay 6BNT of the busy station line.

Relay 6BNT, operated, connects ground to lead 601 through make contact 6BNT–2(6) which ground is transmitted via cable 602 to operate relay 3CN of the no-test trunk. A locking path for relay 6BNT is now closed from ground, make contacts 3ACA–21(3) and 3CN–13(3), lead 304, cable 602, make contact 6BNT–4(6) to battery at the relay winding. Relay 3CNA now operates through make contact 3CN–14(3) and applies ground through make contact 3CNA–9(4) to lead 409; this ground is transmitted over lead 409 to the decoder 704 and operates relay 7OF through make contact 7BNT–2(7). Relay 7OF, operated, applies ground through make contact 7OF–12(7) to lead 712 which ground is transmitted via cable 705 to decoder-marker connector 702 and is effective to release decoder 704. Also ground is applied through make contacts 7BNT–5(7) and 7OF–10(7) to marker lead 714 whereby to release marker 703. Further functioning of the decoder and marker in completion of the connection to the busy line is therefore prevented.

The register sender 707 upon completion of impulse repeating connects ground to lead 603 whereby to operate relay 6RRLS, the ground being applied to lead 603 over lead 706 to link and connector circuit 701, through the switch crosspoints and over leads included in cables 709 and 501. Operation of relay 6RRLS releases relay 2S by interrupting the operate path at break contact 2RRLS–10(2), and releases relay 3ST by interrupting that operate path at break contact 2RRLS–8(3). Also the register removes ground from lead 202 whereby to release relay 2SL; relay 2SL released removes ground from lead 203 at make contact 2SL–12(2) whereby to drop the hold magnet and open the switch crosspoints.

Paths closed between no-test trunk and busy line—Tones applied

Relay 3CN, operated as above described, also closes at make contacts 3CN–1(2), 3CN–2(2), 3CN–3(2), 3CN–4(2), 3CN–5(2), 3CN–6(2), 3CN–7(2), and 3CN–8(2), a group of leads between the no-test trunk and the busy line (via cable 204). Connection between these two circuits is established therefore through direct operation of the no-test relay in the dialed busy line and without further participation beyond this point of the decoder, marker, crossbar switch and other elements ordinarily utilized in completing such a connection. Splitting of the busy line and selective connections of the attendant's transmitter and receiver to either or both ends of the busy line are obviously facilitated by this novel arrangement.

Relay 4PT operates following operation of relay 3CNA over a path from ground, break contact 4TN–2(4), make contact 3CNA–11(4), break contact 3NC–9(4), winding of relay 4PT, break contact 4TCO–10(4) to battery. "Preempt" tone is now applied therefore from source 215 to the transmit pair of the no-test trunk through resistor 206 and make contact of transfer pair 4PT–2(2) and break contact of transfer pair 4TN–6(2) respectively, and through resistor 205 and make contact of transfer pair 4PT–3(2) and break contact of transfer pair 4TN–8(2) respectively. This tone is transmitted to the receivers of the station sets connected to each end of the busy line over the following paths.

First, the tone is connected over leads 207 and 208 to the receiver of the set connected at the source end of the busy line (FIG. 5), make contacts 3CN–3(2) and 6BNT–10(5) and make contacts 3CN–4(2) and 6BNT–12(5) being included in these respective paths and, second, the tone is connected over leads 211 and 212 to the receiver of the set connected at the destination end of the busy line, the make contact of transfer pair 3CNA–4(2), make contact 3CN–5(2), and the make contact of transfer pair 6BNT–1(5) being included in the path through lead 211, and the make contact of transfer pair 3CNA–2(2), make contact 3CN–6(2) and the make contact of transfer pair 6BNT–3(5) being included in the path through lead 212.

This tone serves as a warning to the stations connected to the source and destination ends of the busy line that the attendant has entered the connection preparatory to taking over the line for a call of higher priority.

Time delay circuits 408 and 411 may be any of various types of time delay circuits well known in the art. Time delay circuit 408, which is assumed in the present illustrative embodiment to measure an interval of 1100 ms., is activated upon operation of relay 3CNA, as above described, over a path from battery, make contact 3CNA–6(4) and break contacts 4TCO–11(4) and 3NC–8(4). At the end of the measured interval relay 4TN is operated by ground supplied through the time delay circuit. Operation of relay 4TN is followed by release of relay 4PT as the operate path therefor is interrupted at break contact 4TN–2(4).

Relay 4PT, released, removes the preempt tone from the no-test trunk at the make contacts of transfer pairs 4PT–2(2) and 4PT–3(2). Relay 4TN, operated, connects a 25 kc. tone from source 213 to the transmit side of the no-test trunk through the make contacts of transfer pairs 4TN–8(2) and 4TN–6(2) respectively and through the make contacts of transfer pairs 4TN–11(2) and 4TN–9(2) respectively, and connects this same tone to the receive side of the no-test trunk through the make contacts of transfer pairs 4TN–10(2) and 4TN–12(2) respectively. The tone is accordingly transmitted to the receiver of the attendant, through make contacts 3ACA–1(2) and 3ACA–3(2), to the receiver at the source end of the busy line, via leads 207 and 208, and to the receiver at the destination end of the busy line, via leads 211 and 212. The tone serves to place the attendant's set and the station sets in the talking mode. (It is assumed in this instance that the line was being used by Data-Phone data sets in which case a verbal announcement or request on the part of the attendant would be of no effect.)

Tones removed—Attendant cut through

At the operation of relay 4TN, as described above, time delay circuit 411 is activated by battery supplied through make contact 4TN–5(4). This delay circuit is presumed in the present illustrative embodiment of the invention to measure an interval of 550 ms., at the expiration of which interval ground is applied to the operate path of relay 4TCO through the break contact of transfer pair 4TCO–8(4). Relay 4TCO operates and locks to ground through the make contact of its transfer pair 4TCO–8(4) and make contact 3CNA–12(4). Relay 4TCO, operated, deactivates time delay circuit 408 by interrupting the battery supply path at break contact 4TCO–11(4), and relay 4TN releases.

Relay 4TN, released, removes the 25 kc. tone (source 213) from the attendant's receiver and the receivers at the source end and destination end of the busy line. With relay 4TN released the attendant's transmitter and receiver are closed through to the busy line over the following paths. The attendant's transmitter (connected to the transmit pair of the no-test trunk at the position circuit) is connected through the break contact of transfer pair 4TN–8(2), lead 207, make contacts 3CN–3(2) and 6BNT–10(5) and through the break contact of transfer pair 4TN–6(2), lead 208, make contacts 3CN–4(2) and 6BNT–12(5) to the receiver at the source end of the busy line, and is connected through the break contacts of transfer pairs 4TN–8(2) and 4TN–11(2), make contact of transfer pair 3CNA–4(2), line 211, make contact 3CN–5(2) and make contact of transfer pair 6BNT–1(5) and through the break contacts of transfer pairs 4TN–

6(2) and 4TN–9(2), make contact of transfer pair 3CNA–2(2), line 212, make contact 3CN–6(2), and make contact of transfer pair 6BNT–3(5) to the receiver at the destination end of the busy line.

At this same time the attendant's receiver (connected to the receive pair of the no-test trunk) will be connected through the break contacts of transfer pairs 4TN–12(2) and 3EXS–3(2), line 214, make contacts 3CN–1(2) and 6BNT–5(5) and through the break contcts of transfer pairs 4TN–10(2) and 3EXS–2(2), line 217, make contacts 3CN2(2) and 6BNT–7(5) to the transmitter at the source end of the busy line. It will be noted that with this particular circuit condition the attendant's transmitter is connected to the receivers at both source and destination ends of the busy line and her receiver is connected to the transmitter at the source end of the busy line but that there is no connection between the attendant's receiver and the transmitter at the destination end of the busy line.

"State-of-the-line" indication

Means are provided in the novel arrangement contemplated by our invention whereby an indication of the condition of the connected line will be transmitted by way of the no-test trunk to the attendant. For example, if both the source end and destination end stations are off-hook, the attendant will be appraised of this condition by both source lamp 302 and destination lamp 303 being lighted steady; the circuit functions for attaining this indication are as follows.

When an originating station, that is the source end, goes off-hook, signal unit 604 operating in accordance with its normal function (the specific details of which are not of concern in the present instance) connects ground to lead 607 whereby to operate relay 6LS; relay 6LS, operated, closes and make contact 6LS–10(6) an operate path for relay 6LSA. Accordingly, a path is closed for applying ground to lead 608 through the make contact of transfer pair 6LSA–2(6), make contacts 6BNT–13(6) and 3CN–11(3), break contact of transfer pair 3SR–1(3), winding of relay 3SLP to battery; relay 3SLP operates steady over this path whereby to light source lamp 305 steady through make contacts 3SLP–1(3) and 3SLP–5(3).

Also, when an answering station, that is the destination end, goes off-hook, ground is transmitted over the receive side of the line to operate relay 5S (the specific circuit operations involved are not of specific interest in the present connection). Operation of relay 6S1 follows operation of relay 5S over a path completed at make contact 5S–3(6), so that a path is now closed for applying ground to lead 611 through the make contact of transfer pair 6S1–10(6), make contacts 6BNT–14(6) and 3CN–12(3), break contact of transfer pair 3DR–12(3), winding of relay 3DLP to battery. Relay 3DLP operates steady over this path and lights destination lamp 303 steady through make contacts 3DLP–8(3) and 3DLP–12(3).

The destination lamp 303 and the source lamp 305 are accordingly both lighted steady as an indication to the attendant that both source and destination are off-hook at the moment.

Assuming now that the source end is off-hook but the destination end is on-hook and ringing, source lamp 305 will light steady as before but destination lamp 303 will flash over the path now to be described. After dialing of the called line has been completed and the connection established, but before answer, the register applies ground to lead 603 whereby to operate relay 6RRLS. A path is now closed, therefore, for connecting ground to lead 612 through break contact of transfer pair 6S1–10(6), make contacts 6RRLS–12(6), 6BNT–15(6) and 3CN–10(3), winding of relay 3DR to battery; relay 3DR operates over this path. Relay 3DR, operated, closes a path at the make contact of transfer pair 3DR–12(3) to apply 30IPM ground from ringing circuit 314 over lead 315 to the winding of relay 3DLP whereby the relay operates at this interrupted rate. Destination lamp 303 is accordingly flashed through a path closed intermittently through make contacts 3DLP–8(3) and 3DLP–12(3) as an indication to the attendant that the station at the destination end is ringing.

In the event the source end station set is on-hook and is being rung, relay 6RV stands operated, having operated following operation of register release relay 6RRLS through the make contact of transfer pair 6RRLS–11(6); ringing relay 6R operates following operation of relay 6RV and closure of make contact 6RV–1(6). A path is now closed for applying ground to lead 613 from break contact of transfer pair 6LSA–2(6), make contacts 6RV–8(6), 6BNT–16(6) and 3CN–9(3), winding of relay 3SR to battery; relay 3SR operates and closes a path over lead 315 and make contact of transfer pair 3SR–1(3) for operating relay 3SLP intermittently at 30IPM. Source lamp 305 is accordingly flashed at this rate through the intermittently operating make contacts 3SLP–5(3) and 3SLP–1(3) as an indication to the attendant that the station set at the source end is on-hook and ringing.

So long as the source end remains in the above condition it is desirable that the attendant be able to both transmit to and receive from the destination end and this is attained by the novel arrangement contemplated by our invention. Relay 3SR, operated as above described, closed a path at make contact 3SR–4(3) for operating relay 3EXS. With relay 3EXS operated the attendant's receiver, connected to the receive pair of the no-test trunk through the position circuit, is connected through the respective make contacts of transfer pairs 3EXS–3(2) and 3CNA–10(2), line 218 and make contact of transfer pair 6BNT–9(5) and through the respective make contacts of transfer pairs 3EXS–2(2) and 3CNA–8(2), line 219 and the make contact of transfer pair 6BNT–11(5) to the transmitter at the destination end of the busy line. As previously described above, the attendant's transmitter, connected to the transmit pair of the no-test trunk, is connected via leads 211 and 212 to the receiver at the destination end of the busy line. Accordingly with this circuit condition the attendant is able both to transmit to and receive from the destination end of the busy line.

When the source end goes off-hook relay 3SR releases, relay 3SLP operates steady, and source lamp 305 is lighted steady. With both source and destination ends off-hook, the attendant will again be transmitting to both source and destination ends and receiving from the source end only; these paths have been previously described above.

Register fails to complete—Permanent signal condition

The above description of certain circuit completions was based upon the assumption that the call proceeded normally, that is that the register was able to complete the call in the intended normal manner. However, it may of course happen that the register will be prevented from completing its normal function due to a permanent signal condition.

As described above after the first digit has been transmitted relay 2S operates over the receive simplex. Now, if after the remaining digits are dialed, relay 2RSS is released by the register before relay 2RRLS has operated, relay 4PS will operate from ground, make contact 2S–2(4), break contacts 2RSS–8(4) and 2RRLS–11(4), winding of relay 4PS to battery, and upon operating will lock to ground through make contacts 4PS–5(4) and 3ACA–20(4). Relay 4PS, operated, closes a path through lead 317, make contact of transfer pair 4PS–2(3), break contacts of transfer pairs 3CNA–5(3) and 3NC–11(3), make contact 3ACA–23(3), winding of relay 3TRK to battery whereby to operate relay 3TRK intermittently at a rate of 120 IPM. Trunk lamp 302 is flashed at this rate by the path intermittently closed through make contacts 3TRK–5(3) and 3TRK–1(3) as an indication to the attendant that the register was not able to complete the call in the normal manner.

Unassigned number dialed

Through incorrect operation of the dial or because of incorrect information, a blank or unassigned number code may occasionally be dialed. In the decoder (FIG. 7) all blank numbers are grouped together and cross-connected to lead 717. Assuming for purposes of further description that an unassigned number "999" is dialed, the corresponding tens translator relay 7TT9T will operate and apply ground through make contact 7TT9T–3(7) and code point C999 to lead 717; this ground transmitted over lead 717 to the no-test trunk operates relay 4BN of that circuit. Relay 4BN, operated, applies ground through make contact 4BN–1(44 to lead 409 for operation of relay 7OF in the decoder. As described above, relay 7OF, operated, applies ground through make contact 7OF–12(7) to lead 712 whereby to release the decoder. As also described above release of the marker follows.

No-test call to a trunk

As pointed out above no-test connections to a busy trunk are completed in the same general manner as that described in detail above with regard to a connection to a busy station line. In order to avoid undue complication of the disclosure a trunk circuit is not separately shown in the drawing since the functions pertinent to the present invention can be fully described with reference to identical elements of the station line circuit.

Assuming that the trunk circuit has completed to a station and the circuits are in the talking mode, the no-test trunk connection will be the same as described above in regard to a call to a station line; the source and destination lamps will be lighted steady as an indication that both parties are off-hook.

In the event, however, that the trunk circuit in question has not completed to a station or is in a ringing mode, the trunk responds to the decoder signal by connecting the no-test trunk without transmission lead cut through. In the instance of a trunk circuit the connection of the leads from the no-test trunk is completed by contacts of the 3BNTA relay which corresponds in arrangement and functoin to the 6BNT relay of the station line circuit but which in fact is controlled in its operation by a relay operating the same as the 6BNT; for purposes of the immediate description the last-mentioned relay will be described as the 6BNT.

When the trunk circuit has not completed to a station or is a ringing mode as described above, relay 3NC of the no-test trunk will be operated by ground applied to lead 318 from the busy trunk. Relay 6BNT of the busy trunk will be operated but relay 3BNTA will not operate at this time since the operate path is interrupted at the break contact of transfer pair 3NC–13(3). Accordingly, while relays 3CN and 3CNA are operated, the leads connecting the busy trunk and the no-test trunk will not be cut through since relay 3BNTA is not operated (as just pointed out relay 3BNTA of the trunk performs the cut through function performed by relay 6BNT of the station line circuit.)

Start of timer circuit 408 for application of the "preempt" tone is delayed in this instance as the activating path is interrupted at break contact 3NC–8(4), while a path is closed at the make contact of transfer pair 3NC–11(3) for operation of relay 3TRK at an intermitten rate of 60 IPM. Trunk lamp 302 is accordingly flashed at this rate as an indication to the attendant that the connection to the trunk canno be completed at this time.

Under the above circumstance the attendant may elect to release in which case the circuit will return to normal. On the other hand if she elects to hold until the trunk assumes a talking mode, relay 3NC then will release, relay 3BNTA will operate and the no-test call will proceed in the normal manner.

It is to be understood that the above-described arrangements are illustrative of the application of the principles of the invention. Numerous other arrangements may be devised by those skilled in the art without departing from the spirit and scope of the invention.

What is claimed is:

1. In a private branch exchange telephone system, a plurality of extension stations, a plurality of lines for connecting said extension stations, an attendant's position, a no-test trunk, a group of normally open transmission paths between said no-test trunk and each of said lines, a marker, a decoder, means at said position for seizing the no-test trunk and for connecting said marker and decoder thereto, a plurality of distinctive code points in said decoder corresponding respectively to said lines, a relay in each of said lines, means for transmitting over said no-test trunk to said marker and decoder dialed impulses corresponding to the code of a respective one of said lines which is in busy condition together with a no-test class mark, means in said decoder responsive to the no-test class mark and the dialed code to select the particular code point corresponding to the dialed busy line and to apply ground to the selected code point whereby to operate the respective relay in the dialed busy line, and means responsive to operation of said relay for selectively closing certain of the group of transmission paths between said no-test trunk and said busy line whereby said attendant's position is connected through the no-test trunk to the busy line.

2. In a private branch exchange telephone system, the combination defined by claim 1 further characterized in that said means for operating the relay in the busy line includes a cross-connecting path between said selected code point and said relay.

3. In a private branch exchange telephone system, the combination defined by claim 2 further characterized in means after operation of said relay for releasing said marker and decoder from the connection to said no-test trunk.

4. In a private branch exchange telephone system, the combination defined by claim 3 further characterized in that the means in said decoder for applying ground to the selected code point includes a digit relay and means for selectively operating said digit relay in response to the particular code dialed.

5. In a private branch exchange telephone system, the combination defined by claim 4 further characterized in means effective upon said group of transmission paths being closed for interrupting said busy line between the respective source and destination ends.

6. In a private branch exchange telephone system, the combination defined by claim 5 further characterized in means for selectively connecting certain of said transmission paths to said source end of said busy line and others of said paths to said destination end.

7. In a private branch exchange telephone system, the combination defined by claim 6 further characterized in that said no-test trunk circuit and each of said lines each comprises a 4-wire circuit consisting of a transmit pair and a receive pair, a tone source, and means effective upon said group of transmission paths being closed for applying tone from said source to the transmit side of said no-test trunk and to both transmit and receive pairs of the busy line.

8. In a private branch exchange telephone system, the combination defined by claim 7 further characterized in a second tone source, means effective after a predetermined interval for disconnecting from said no-test trunk and said busy line the tone from said first tone source and for applying tone from said second source to both the transmit and receive pairs of said no-test trunk and the transmit and receive pairs of the busy line, and means effective after a second predetermined interval for disconnecting the tone from said second tone source.

9. In a private branch exchange telephone system, the combination defined by claim 8 further characterized in means effective after operation of said relay in the busy line and when the source end of the busy line is on-hook and in ringing condition for connecting the receive pair of said no-test trunk to the destination end of the receive pair of the busy line and effective when said source end goes off-hook in response to the ringing for interrupting said last-mentioned connection and for connecting said receive pair of said no-test trunk to the source end of the transmit pair of the busy line.

10. In a private branch exchange telephone system, the combination defined by claim 9 further characterized in means effective upon closing the group of paths between the no-test trunk and the busy line for indicating at said position the off-hook or ringing condition at both the source and destination ends of the busy line.

11. In a private branch exchange telephone system, the combination defined by claim 10 further characterized in additional means for effecting the release of said marker and decoder from the connection to said no-test trunk and means effective upon dialing the code corresponding to an unassigned number to activate said additional means.

12. In a telephone switching system, a plurality of stations each having an individual line circuit, attendant's position, switching means for establishing connections to said position and said line circuits, control means including decoder means for controlling said switching means, a no-test trunk, and means for establishing connections between said position and a selected one of said line circuits through said no-test trunk independent of said switching means, said establishing means including a plurality of distinctive code points in said decoder means corresponding respectively to said line circuits, a relay in each of said line circuits, means for transmitting to said control means the designation of a particular one of said line circuits which is in a busy condition, means in said decoder means responsive to a no-test class mark and said designation in said control means for selecting the particular code point corresponding to said particular line circuit and for applying ground to said particular code point to operate the respective relay in said particular line circuit, means for inhibiting operation of said control means to prevent establishing connections by said switching means to said particular line circuit, and means responsive to operation of said relay for selectively closing certain of said connections between said no-test trunk and said particular busy line whereby said attendant's position is connected through said no-test trunk to said particular busy line.

13. In a telephone switching system, a plurality of line circuits, a marker, a position circuit, a no-test trunk circuit, switching means for establishing connections to said line and position circuits, control means responsive to said marker for controlling said switching means, and means for selectively establishing certain connections between said position circuit and a selected line crcuit through said no-test trunk circuit independent of said switching means, said establishing means including code points corresponding respectively to said line circuits in said control means, means for applying ground to said code point corresponding to said selected line circuit, means responsive to said ground for preventing said control means from further controlling said switching means, and means in said selected line circuit responsive to said ground for closing connections between said no-test trunk circuit and said selected line circuit.

References Cited

UNITED STATES PATENTS

| | | | |
|---|---|---|---|
| 2,365,996 | 12/1944 | Bakker. | |
| 3,327,065 | 6/1967 | Michalopoulos | 179—27.22 |

RALPH D. BLAKESLEE, Primary Examiner

U.S. Cl. X.R.

179—18, 84